United States Patent [19]
Fushimi et al.

[11] Patent Number: 6,091,678
[45] Date of Patent: Jul. 18, 2000

[54] METHOD AND APPARATUS FOR DETECTING POSITION OF ALTERNATED LAND AND GROOVE OF INFORMATION RECORDING MEDIUM

[75] Inventors: Tetsuya Fushimi, Chigasaki; Toru Kawashima, Fujisawa; Hisataka Sugiyama, Kodaira; Hiroyuki Minamura, Yokohama; Yoshio Suzuki, Fujisawa; Hisamitsu Tanaka, Yokohama, all of Japan

[73] Assignees: Hitachi, Ltd.; Hitachi Video & Information Systems, Inc., both of Tokyo, Japan

[21] Appl. No.: 09/002,830

[22] Filed: Jan. 5, 1998

[30] Foreign Application Priority Data

Jan. 6, 1997 [JP] Japan ..................... 9-000027

[51] Int. Cl.$^7$ ..................................... G11B 7/00
[52] U.S. Cl. ..................... 369/44.26; 369/44.28; 369/44.29; 369/58
[58] Field of Search ............... 369/44.26, 44.27, 369/44.28, 44.29, 47, 48, 50, 54, 58, 275.3, 275.4, 32, 33

[56] References Cited

U.S. PATENT DOCUMENTS 5,566,141  10/1996  Yamaguchi et al. .................. 369/44.28

FOREIGN PATENT DOCUMENTS

| 4-4661 | 1/1992 | Japan . |
| 6-176404 | 6/1994 | Japan . |
| 7-141701 | 6/1995 | Japan . |
| 8-221821 | 8/1996 | Japan . |

*Primary Examiner*—Paul W. Huber
*Attorney, Agent, or Firm*—R. William Beard, Jr.; Frohwitter

[57] ABSTRACT

For a disk of a land/groove scheme with land tracks and grooves appearing alternately, in order to enable stable and reliable reproduction of information as recorded on a disk by stably and reliably detecting a specific position at which a land track and groove change therebetween, a technique is employed for detecting the position whereat one land track is changed to a groove, or vice versa, by utilizing an HPP signal rather than an RF signal in cases where an optical head 103 attempts to reproduce certain information at the pit formation position of a disk 101. In addition, detect the polarity—positive or negative—of a pit signal appearing in the HPP signal, and then detect the position whereat the land track and groove change therebetween based on the position at which the order or sequence thereof changes, thereby permitting effectuation of optical head's tracking control and focus control by a method suitable for its respective parts.

29 Claims, 8 Drawing Sheets

FIG. 7k  HPP SIGNAL OUTPUT

FIG. 7m  HIGH-FREQUENCY CUTOFF OUTPUT

812 UPPER SLICE LEVEL

813 LOWER SLICE LEVEL

FIG. 7n  COMPARATOR #1 OUTPUT

FIG. 7p  COMPARATOR #2 OUTPUT

FIG. 7q  POSITIVE PIT DETECTION SIGNAL

FIG. 7r  NEGATIVE PIT DETECTION SIGNAL

FIG. 7s  LOGICAL SUM OUTPUT (PID DETECTION SIGNAL)

METHOD AND APPARATUS FOR DETECTING POSITION OF ALTERNATED LAND AND GROOVE OF INFORMATION RECORDING MEDIUM

BACKGROUND OF THE INVENTION

The present invention relates generally to architecture of recording and reproducing information to and from optically readable storage media (referred to as the "disks" hereinafter), and more particularly to a method and apparatus for detecting position of alternated land and groove track of an information recording medium corresponding to a certain disk as formatted to accommodate advanced high-density information storage techniques.

Reproducing of information is performed by focussing a beam of laser light onto the data recorded layer of an optical disk and then detecting its reflection light modulated by a series of recording marks or "pits" as defined in the data layer. The recording marks or pits are recorded in a track as formed along a spiral groove track formed in the data layer. To increase the recording density, it is required that a disk-shaped optical storage medium be of high density in the thickness direction, circumferential direction, or radial direction thereof. One currently available approach to increasing the radial recording density is to decrease or narrow the track pitch of read/write tracks; unfortunately, this approach suffers from a problem in that such track pitch reduction has a limitation due to fabrication process of groove tracks.

Another approach to high density recording is disclosed in Japanese Patent Publication No. 4-4661, wherein an optical disk proposed therein is designed to render the width of a groove track per se substantially identical to the width of part that lies between adjacent groove tracks while setting the depth of groove tracks at a carefully selected value which minimizes cross-talk from neighboring tracks—the crosstalk is determinable by the wavelength of a laser beam irradiating the groove track depth—thereby permitting formation of recording marks between neighboring ones of the groove tracks in a similar way. With this approach, the use of recording marks provided between groove tracks may enable recording and reproduction of information, which in turn leads to the capability of improving the radial recording density of optical disks. A track provided in the groove tracks is called the "groove track," whereas another track as defined between groove tracks is known as the "land-portion track."

Continuous reproduction of information being recorded at the groove portion and land portion is as follows: in an optical disk with a continuous pattern of groove tracks being simply formed on the data layer from a point near the inner diameter toward the other point near the outer periphery thereof, certain time lag might take place when the operation mode is switched from continuous groove reproduction to continuous reproduction of land portions, or vice versa; this in turn makes it impossible, or at least very difficult, to continuously play back intended information of a land portion and that of its associated groove.

One typical approach to avoid the "continuous land/groove information reproduction incapability" problem is disclosed in Published Unexamined Japanese Patent Application ("PUJPA") No. 7-141701, wherein the groove tracks are formed in a way such that the tracks of land portions and grooves appear alternately for about every one circumference or "revolution" to thereby enable continuous reproduction of the prerecorded information at the land portions and grooves. An optical medium of this type is known in some cases as the "single spiral" disk among those skilled in the art to which the invention pertains.

In optical disks employing the single-spiral groove-track scheme, modulated position information is stored by formation of a train of pits on the track, and the read/write position is identifiable by reproducing such pit information for detection of a position alternated land and groove track at which a change occurs between the land portion and groove. However, this prior art approach does not come without accompanying a problem which follows: it remains difficult to form the pit information with respect to every track with high density and is also difficult to attain reproduction and demodulation with intended precision due to unwanted affection of crosstalk from a pit array formed in its neighboring tracks.

A still another prior art approach is disclosed in PUJPA No. 6-176404, which permits reproduction of information as to the position alternated land and groove track at both the land portion and the groove by forming pits in a way such that it is positionally shifted or "offset"—inwardly or outwardly on the disk layer—by a predefined distance equivalent to a quarter (¼) of the center-to-center pitch of one land portion and its neighboring land portion.

A further prior art approach is disclosed in PUJPA No. 8-221821, which proposes pre-formatting the pits in the circumferential or tangential direction of tracks at substantially equal intervals and forming the pits so that these are alternately offset, inwardly and outwardly, from the center of the land portion or groove by a distance equivalent to ¼ of the center-to-center pitch of adjacent land portions. The "alternate offset pit formation" approach enables an optical disk of this type to form specific information capable of relatively identifying the position alternated land and groove track at some physical identification (PID) sections other than a PID section for use in forming a pit(s) corresponding to the position alternated land and groove track.

For reproduction of the recording marks formed on the optical disk with such land and groove portions, it should be required that a spot of laser beam falling onto the data layer thereof scan along approximately the center position of a land portion or groove relative to the radius direction of the "land/groove alternate offset" optical disk, while at the same time requiring retainment of exact focussing on the data layer. In this case, the magnitude of a deviation (tracking deviation amount) which is substantially proportional to the distance of a laser beam spot from the center of either the land portion or the groove may be acquired by a tracking error signal (high-frequency push-pull or "HPP" signal) obtainable by detection of diffraction light components of the laser beam from groove tracks, for controlling (tracking control) the light collection or "focus" position of the laser beam by use of such deviation amount, wherein the deviation amount is inverted in polarity between the land portion and groove.

Accordingly, the tracking control used must be designed so that the deviation amount of the tracking error signal is inverted in polarity between the land portion and groove.

Figure 10:
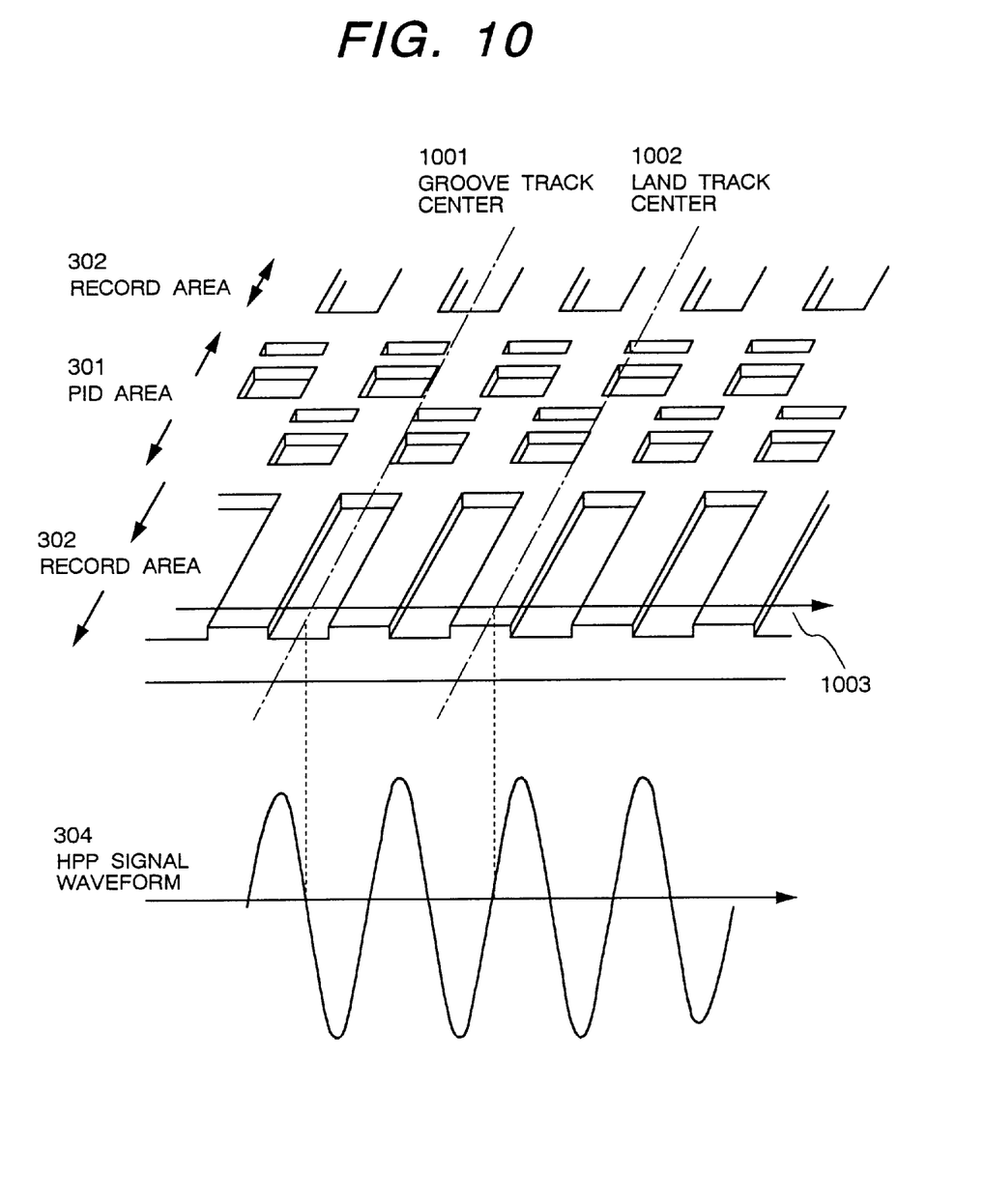
FIG. 10 is a pictorial representation of an optical disk employable in the invention.

FIG. 10 is a schematic diagram showing part of the data layer of a disk-like optical medium layer near the PID section. Numeral "304" designates an HPP signal waveform based on the tracking deviation amount as generated when a beam spot virtually moves transversely with respect to the radial direction 1003 of the disk medium. As apparent from this diagram, the HPP signal is different in polarity between the land portion and groove. More specifically, when the HPP signal is negative in polarity for the land portion, it is to be judged that the beam spot is positionally deviated in the right direction of the plane of drawing of FIG. 10 relative to a groove track center 1001 thus performing a tracking control by causing the beam spot to move in the left direction of the plane of drawing; for the land portion, when the HPP signal is negative, then this tells that the beam spot is deviated in the left direction of the plane of drawing relative to a land track center 1002 thus effectuating the tracking by causing the spot to move rightward on the drawing plane.

Consequently, for continuous or "seamless" reproduction of information while the spot moves from the land portion to the groove or vice versa, it should be needed to control the focus position of laser beam in responding to occurrence of polarity inversion of the deviation amount at a specific position whereat a beam-focussed surface portion changes between the land portion and groove—namely, at the position alternated land and groove track. To do this, certain areas are defined with substantially equal intervals on the tracks of disk in the tangential direction thereof then forming pits indicative of the position alternated land and groove track in such areas, as taught from PUJPA Nos. 6-176404 and 8-221821. These pits are formed in a way such that reproducing the pit information renders recognizable the specific position (position alternated land and groove track) whereat the land and groove portions change therebetween while simultaneously permitting a switching of the status of tracking control, focus control and the like based on resultant information read therefrom.

One problem encountered with the approach to reproduction—by forming pits that lie midway between the land and groove portions and then reading the pit information by use of a radio frequency (RF) signal based on a change in total quantity of reflection light for effectuation of intended tracking control and focus control—is incapability of attaining an increased signal amplitude due to "offset" formation of the pits from the track center. This in turn raises a problem of position alternated land and groove track detection difficulty while rendering difficult any successful execution of the tracking control and focus control, resulting in noticeable difficulty of reproduction of recorded information.

Another problem faced with the prior art is that with the position alternated land and groove track detection by bit information reproduction, the position alternated land and groove track will no longer be recognizable in cases where the reproduction of pits is difficult due to pit formation defects, disk shape irregularity, or several kinds of unwanted control variations.

A further problem of the prior art is that the position alternated land and groove track becomes unpredictable upon erroneous detection of a plurality of PID sections because of the fact that the position alternated land and groove track is defined by its relative positional relationship with other PID sections. Also where the number of rotation or the linear velocity of disk medium is rapidly varied due to access operations, the phase-locked loop (PLL) control of a reproduced signal becomes unattainable making it impossible to demodulate and reproduce the pit information.

SUMMARY OF THE INVENTION

It is therefore an object of the present invention to avoid the problems associated with the prior art and to provide a method for controlling light irradiation means with enhanced reliability by stable detection of the PID position and position alternated land and groove track along with an information read/write apparatus employing the same.

To attain the foregoing object, the present invention is to detect the PID and position alternated land and groove track by use of the HPP signal rather than the RF signal.

As shown in FIG. 10, a train of pits may be equivalent to an array of short or fine grooves along the circumferential or tangential direction of an optical disk; in this sense, where a beam spot moves to track along either the groove track center 1001 or land track center 1002, a signal is output which has a specific level between a first level at the boundary between the land and groove portions and a second level corresponding to the absence of grooves, i.e. zero-signal level, depending upon whether a pit is present or absent in the PID area 301.

In other words, use of the HPP signal may enable the pit reproduction signal to sufficiently increase in amplitude, which in turn enables successful reading of information as contained in the pits. Reading this information makes it possible to detect the position alternated land and groove track whereat a beam-focussed surface portion is changed between the land and groove portions.

In addition, while a pit-information reproduction signal is output on the HPP signal, the polarity of such reproduction signal representative of the pit information being output on the HPP signal is determined at this time in view of the fact that such pits formed are shifted or "offset" in position from the center of a land or groove portion toward either the inner diameter area or the outer periphery of an optical disk—namely, inwardly or outwardly on the data layer thereof. Since the order or sequence of such inward or outward offset positioning is determined in accordance with the land or groove portion, it becomes possible to correctly identify whether a presently focussed beam spot is scanning the land portion or the groove by detecting the sequence of the positive and negative polarities of an output signal corresponding to the pit train in the disk data layer. The identification result will be detected as the position alternated land and groove track where a disk layer portion the beam spot is focussed upon changes from the land portion to the groove, or vice versa.

Stable detection of the position alternated land and groove track in the way described supra may enable successful achievement of intended focussing control and tracking control as optimized for both the land portion and the groove thus offering the capability of reliable recording and reproducing information as stored or recorded on the disk over the entire data layer thereof.

BRIEF DESCRIPTION OF THE DRAWINGS

in FIG. 1a.

FIGS. 5a through 5j show an exemplary output signal of a PID position detector in accordance with a first embodiment of the invention;

FIGS. 7k through 7s show some exemplary output signals of a PID position detector in accordance with a second embodiment of the invention;

DETAILED DESCRIPTION OF THE PREFERRED EMBODIMENTS

Figure 1A:
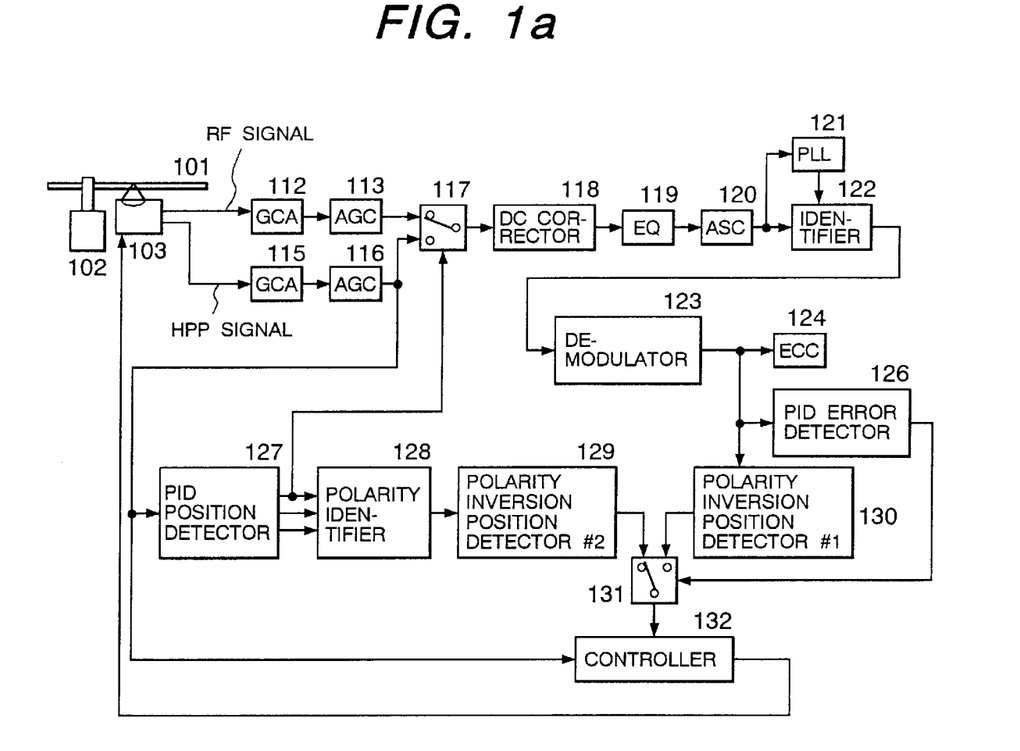
FIG. 1a is a block diagram of a reproduction processing system of information read/write apparatus employing the principles of the present invention.
Figure 1B:
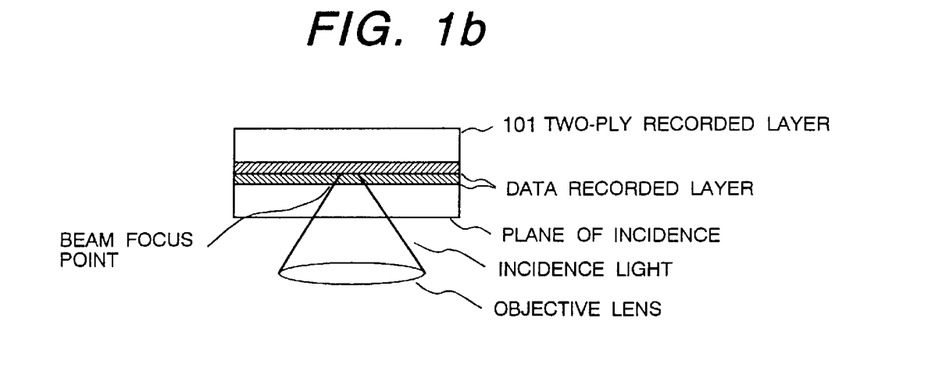
FIG. 1b is a schematic diagram showing the detail of the optical data storage medium.

FIG. 1a is a schematic block diagram of one preferred embodiment of the present invention. A disk-shaped optical data storage medium 101 is driven by a spindle motor 102 to rotate at a substantially constant linear speed or velocity. An optical head 103 has several built-in parts or components, including a semiconductor laser device, optical parts for light collection or focussing a laser beam onto the information recording layer (referred to as "data layer" hereinafter) of the optical disk 101, a photodetector for detecting a reflected light, an actuator for rendering the beam focus position variable, and others.

The optical head 103 is operable to generate at its outputs potential value-variable voltage signals that correspond to the RF signal and HPP signal, which signals are then supplied respectively to gain controller circuits 112 and 115, each called the gain control apparatus (GCA). Each GCA has its constant preset gain and operates to output it to a corresponding one of automatic gain controller (AGC) circuits 113 and 116 associated therewith. These AGCs provide output signals each having a substantially constant potential level, which signals are sent to a select switch 117. The select switch 117 switches or changes over depending upon whether a beam spot is focussed onto PID sections or information/data areas on the data layer of disk 101, outputting an HPP signal of PID area and an RF signal in data area to a direct current (DC) corrector circuit 118 connected thereto.

Thereafter, when the select switch 117 selects the HPP signal, the DC corrector 118 suppresses DC variation components of two kinds of PID information items within the HPP signal and those of the RF signal, thereby outputting the result to a waveform equalizer (EQ) circuit 119. EQ 119 compensates for high-frequency components which were lowered in the optical system and the like. The output of EQ 119 is then passed to an automatic slice-level controller (ASC) 120, which operates to digitize it at a certain slice level of the signal-component duty ratio of approximately 50%, thus providing the resultant signal to a phase-locked loop (PLL) 121 and identifier 122.

PLL 121 generates a substantially constant reproduction clock signal that is responsive to the edge distance of an input signal, whilst identifier 122 performs binarization of the output signal of ASC 120 at a timing as synchronized with the edge of such reproduction clock to thereby output a series of signals. The signal "train" is supplied to a demodulator 123 for intended demodulation in conformity with preselected demodulation rules in such a way that 16-bit signal train is converted to 8 bit data, by way of example, while letting data in the record area be subject to an error correction processing at an error correction code (ECC) circuit 124. The data signal train of the PID section is passed to a first position alternated land and groove atrack detector 130 which attempts to detect from the prerecorded PID information a change in polarity of tracking and focussing in front or rear of such PID section.

The first position alternated land and groove trackdetector 130 and PID error detector 126 operate in synchronism with the reproduction clock as generated by PLL 121, enabling prediction of the position and content of a PID to be next reproduced from the position of PID thus detected and the content demodulated. Accordingly, it is possible to output a control signal with no delay, which in turn makes it possible, even where the PID area information is incapable of being reproduced at a single location, to generate the control signal by use of one prior pit information thereof.

The signal train from demodulator 123 is input to PID error detector 126 for detection of whether an error(s) is/are present in the PID information; when an error or errors are contained in the PID information reproduced, its one prior PID information is used to predict such PID information and then output the control signal to a controller 132.

It should be noted that where a multiple of PID errors are continuously occurred (the exact number of error occurrence may appropriately be set on a case-by-case basis), detection of the position alternated land and groove track from the PID information will no longer be attainable rendering difficult effectuation of intended tracking control and focus control. To avoid this, the select switch 131 is controlled to perform a switching operation thereby selecting its state which supplies an output signal of a second position alternated land and groove track detector 129 to the controller 132. In the other cases except this, select switch 131 permits transmission of the output from first position alternated land and groove track detector 130 to controller 132 because of the fact that the tracking control and focus control are hardly affected providing advantages such as predictability of the position and content of the next reproduced PID from the content thus demodulated.

Additionally, the output signal of AGC 116 is also supplied to a PID position detector 127 so that the control signal is output from PID position detector 127 to select switch 117 and polarity identifier 128. Supplied to select switch 117 is a PID position detection signal for identification of the PID section and record area. When the PID position detection signal indicates the PID section, select switch 117 operates to select the HPP signal greater in amplitude of a pit reproduction signal; on the contrary, when indicating the record area, select switch 117 selects the RF signal. Whereby, it becomes possible to reliably read the information contained in pits even for those disks with pits offset from the track center as employable in the invention.

Supplied to polarity identifier 128 is a signal indicative of the detection position of a signal as output onto the HPP signal to have either the positive (plus) or negative (minus) polarity in a way corresponding to two PIDs within the PID section. Polarity identifier 128 is responsive to a detection signal of positive and negative signals at the PID section, for determining which disk layer the beam is focussed upon— i.e. whether it is incident on the land track or the groove of a track being presently scanned.

The second position alternated land and groove track detector 129 is responsive to an output of polarity identifier 128 for detecting a PID position at which the polarity of track changes depending upon which part—namely, land track or groove—of the disk layer the laser beam is focussed upon, while the beam spot moving from a groove to a land track or vice versa, thereby providing an output signal representative of the detected PID position to a select switch 131 as operatively associated therewith.

It is to be noted here that where detection of the PID section is unable (due to defects of the PID section, reproduction errors caused by possible deviations such as unwanted tilting or displacement of the disk medium, PLL errors originated from rotational deviations and others), the select switch 131 outputs the position alternated land and groove track information to controller 132; in the remaining cases, select switch 131 supplies thereto the polarity inversion information output from first polarity inversion position detector 130.

The output signal of the AGC 116 which receives the HPP signal is input to controller 132 as the magnitude of deviation from the track center. Controller 132 in turn provides a tracking control signal to the tracking-control actuator built in the optical head 103 to ensure that the beam spot being focussed onto the disk layer attempts to accurately move along the track centerline. At this time, the position alternated land and groove track information is used to change the polarity of output control amount depending upon which layer the beam is focussed upon, i.e. land track or groove.

Although not specifically illustrated in the accompanying drawings, the magnitude of focus offset is switched, during the beam spot-focussing control (focus control) when reproduction of the land track or groove, between specified offset amounts in a manner corresponding to which one of the land track and groove the beam is presently focussed upon.

Figure 2:
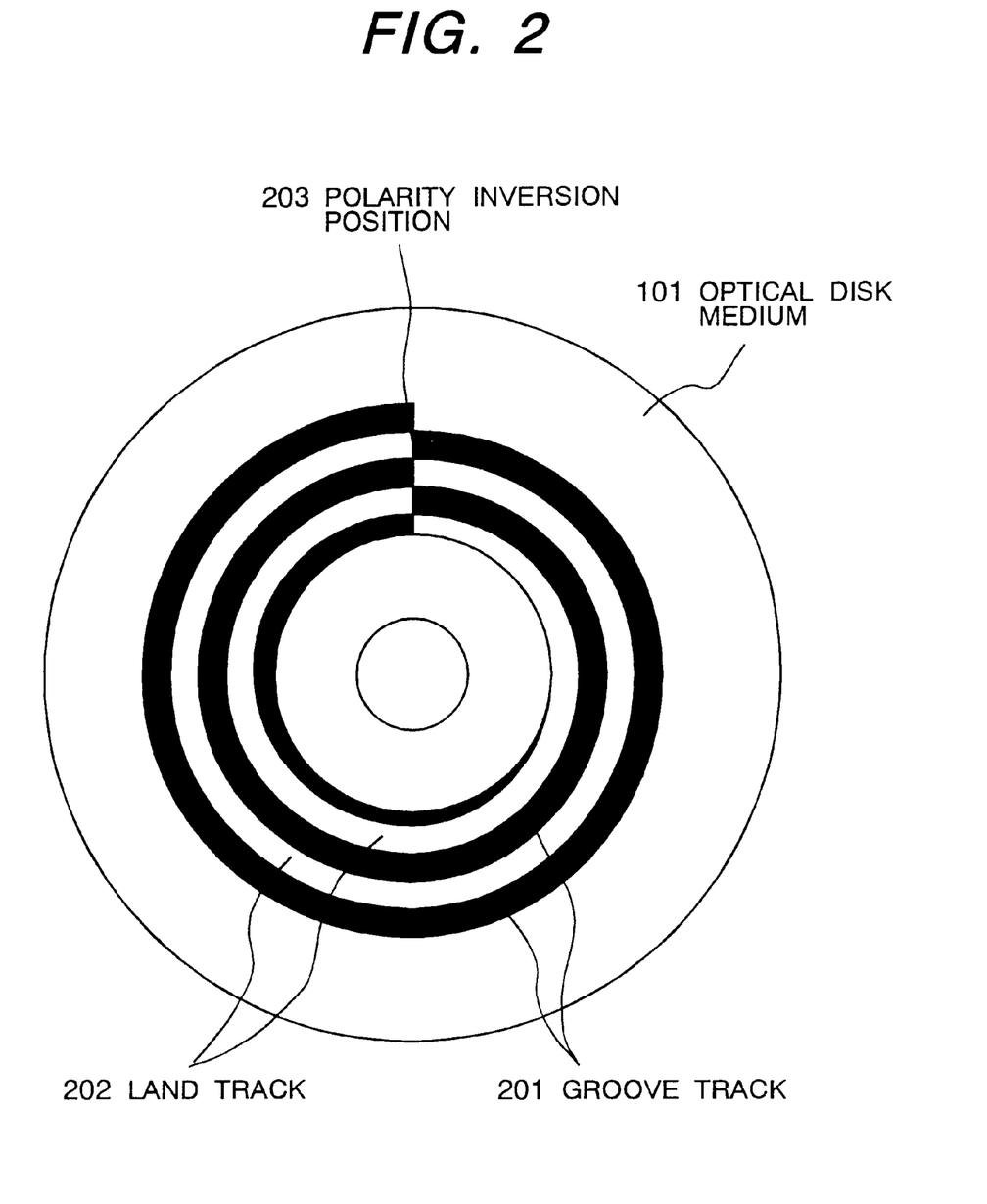
FIG. 2 is a diagrammatic representation of a disk-shaped optical storage medium associated with the apparatus of FIG. 1, which medium may be similar in general configuration to a prior art disk.

FIG. 2 is a schematic diagram showing a planar configuration of a disk-shaped optical medium 101 for use with the apparatus of FIG. 1a embodying the invention. As shown, the optical disk 101 has on its data layer a spirally formed track pattern which extends from the inner diameter and ends near the outer diameter. The track comes with groove track segments 201 and land track segments 202 which are such that the track pattern is alternately switched per revolution between one groove track 201 and one land track 202 at a position alternated land and groove track 203.

While not particularly depicted in FIG. 2, the track pattern has a predefined number—here, seventeen (17) to forty (40)—of PIDs that are tangentially formed on the track per revolution at substantially equal intervals, while the information as to the radial and tangential positions and the information specifying whether it is the position alternated land and groove track are uniquely recorded therein as one or more pits.

Figure 3A:
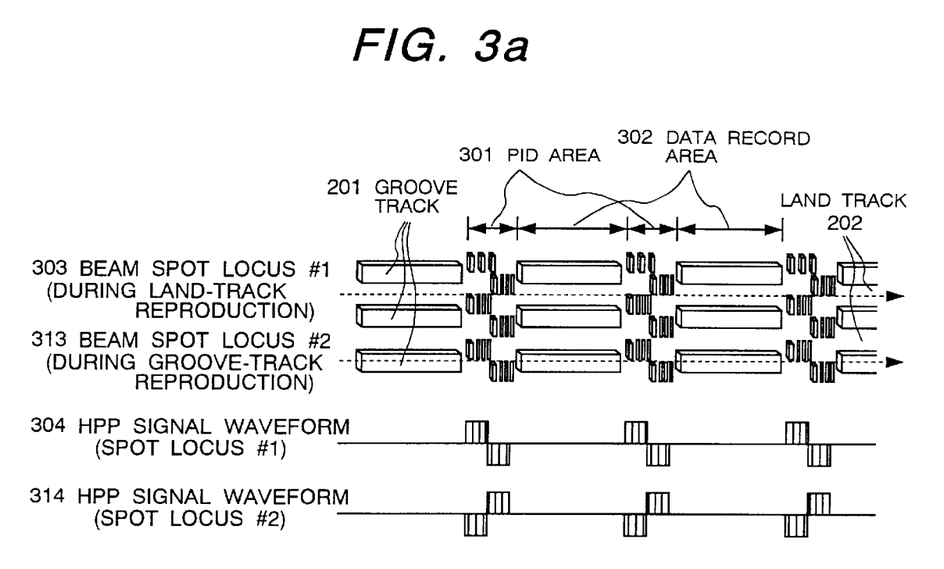
FIGS. 3a and 3b show a track configuration of the disk of the invention and an exemplary output waveform of a track deviation signal.

FIG. 3 shows schematic configurations of the on-disk tracks and PIDs along with the waveform of an HPP signal obtainable when a beam spot attempts to scan one of them. The shape of tracks at positions other than the position alternated land and groove track 203 is shown in FIG. 3a. In the radial direction, groove tracks 201 and land tracks 202 are alternately formed. In the tangential direction PID areas 301 and record areas 302 are alternately formed with a substantially constant distance between the PID areas.

The PID sections contain therein multiple pits that are formed in a manner such that these are shifted in position— i.e. offset—inward or outward relative to the center of a corresponding track on the data layer by a specified distance equivalent to a quarter (¼) of the interval or "pitch" of groove tracks. The PID shifted outwardly has a recorded value which corresponds to the sum of the number of the inward PID per revolution as position information of the radial direction and the tangential direction. Reference numeral 304 is used to designate the HPP signal waveform obtainable when the beam spot is scanning one land track in a way as designated by numeral 303. In the PIDs a signal corresponding to the pit information is output with the positive and negative levels with respect to a level at the record area of HPP signal. Numeral 314 denotes the waveform of HPP signal when the spot scans one groove track. As compared to the case of land track reproduction, this is reversal in sequence or order of outputting the positive and negative pit signals.

Figure 3B:
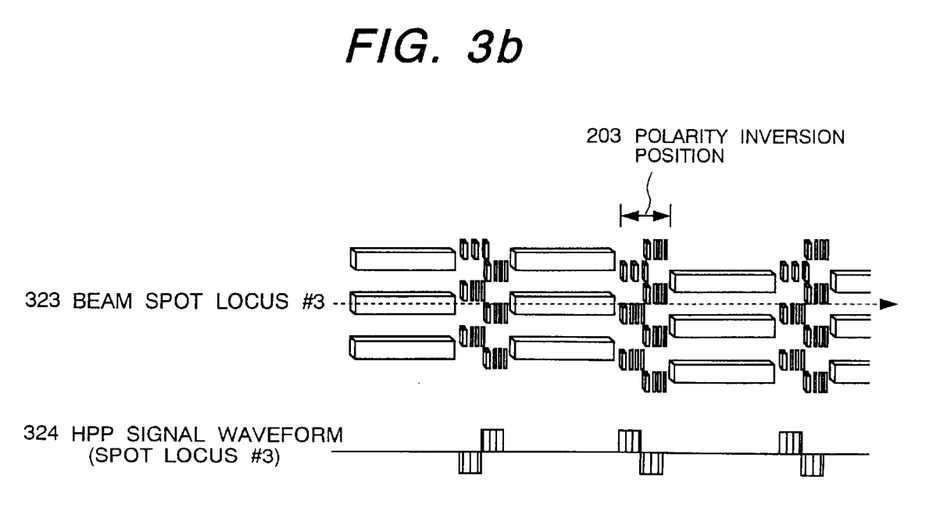

Reference numeral 324 of FIG. 3b designates an HPP signal waveform obtainable when the laser beam spot as presently focussed on the disk layer passes through the position alternated land and groove track 203 then moving from one groove track to its succeeding land track. The resulting locus of beam spot in this case is shown by numeral 323. It would be readily seen by those skilled in the art that a reverse of sequence takes place between the output waveform of a pit signal of one PID section at the position alternated land and groove track and that of its immediately preceding PID section.

Accordingly, this makes it possible to detect the position alternated land and groove track using such signal reversing, which may in turn enable successful achievement of intended switching operations for changing the polarity of tracking control plus the magnitude of offset of focus control.

Figure 4:
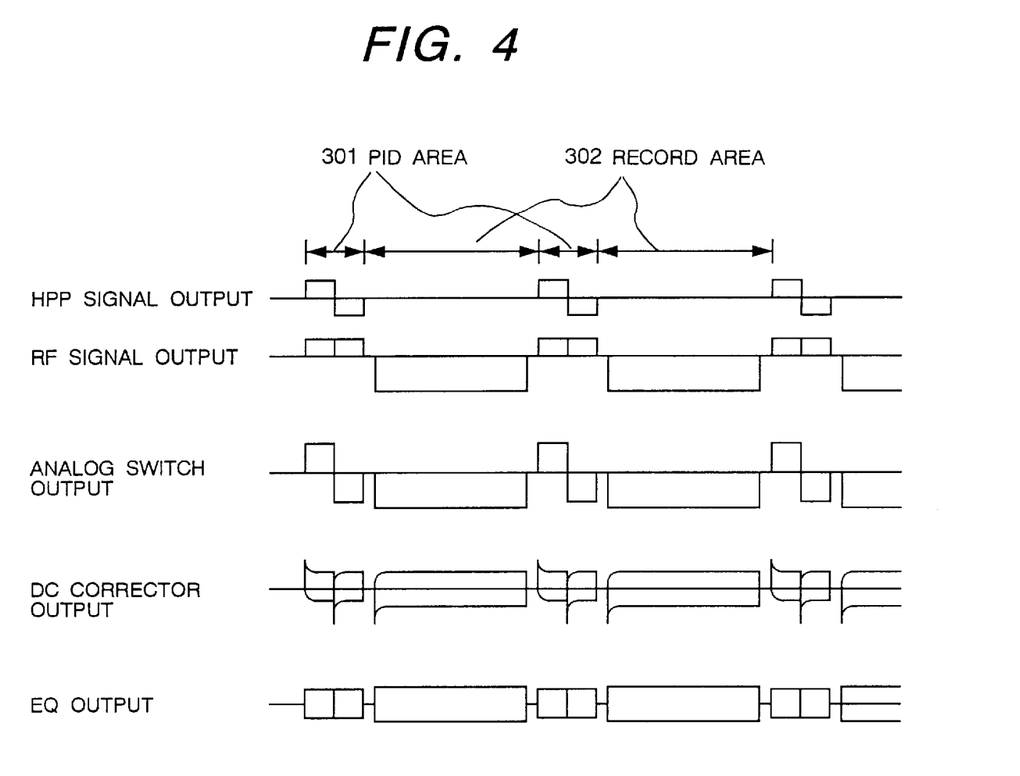
FIG. 4 is a diagram showing a reproduction signal of the reproduction processing system of the invention.
Figure 5A:
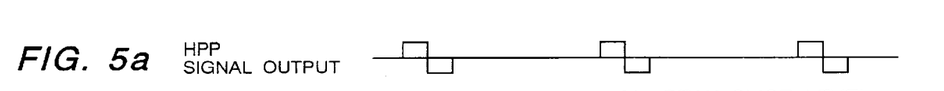
Figure 5B:
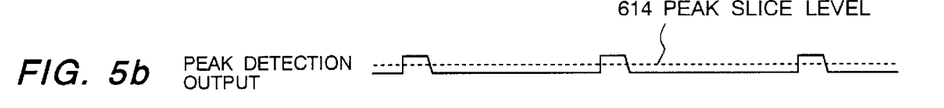
Figure 5C:
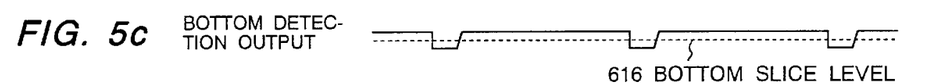
Figure 5D:
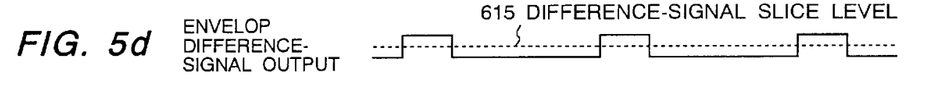
Figure 5E:
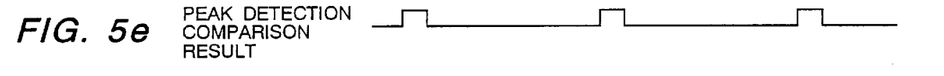
Figure 5F:
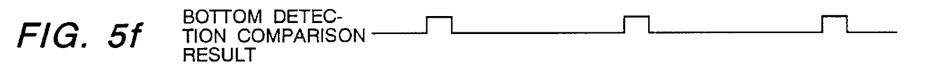
Figure 5G:
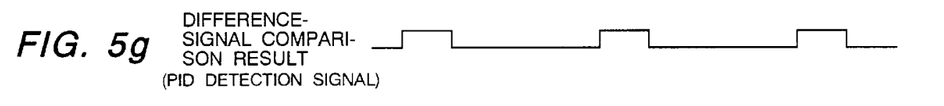
Figure 5H:
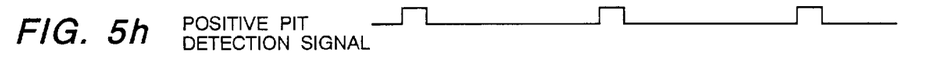
Figure 5J:
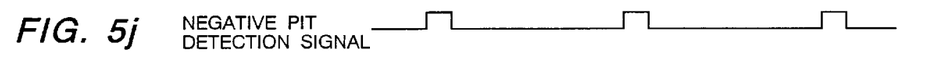

FIG. 4 schematically illustrates waveforms of some major signals available during reproduction of land tracks, including an HPP signal output, RF signal output, output of select switch 117, output of DC corrector 118, and output of EQ 119. The HPP signal's pit information at the PID section is combined by select switch 117 with the recording mark information in record area of RF signal. The resultant combined signal is passed to DC corrector 118 for suppression or elimination of possible DC potential variations, providing a DC-corrected signal which is then routed to EQ 119 for compensation for any possible signal reduction in high-frequency band and also for suppression of a variation in low-frequency bands. Causing ASC 120 to digitize this signal output may enable reproduction of the pit information and recording mark information in a similar way.

Figure 6:
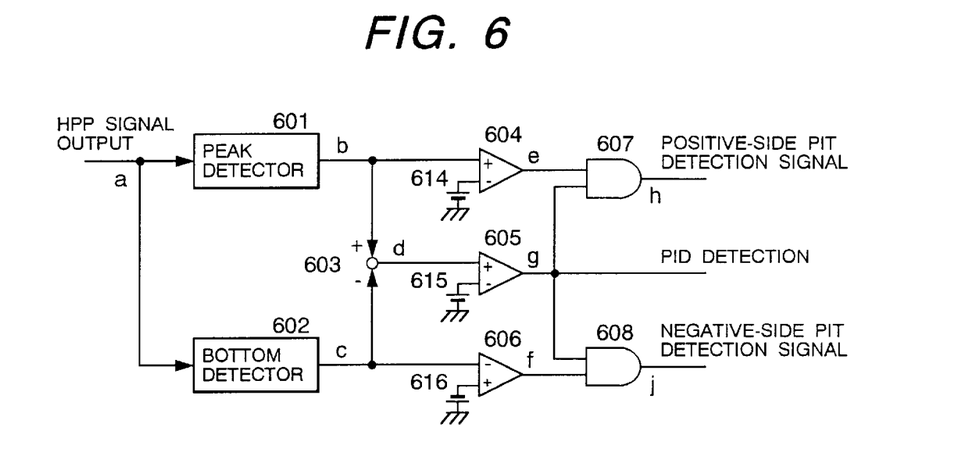
FIG. 6 is a block diagram of the PID position detector of the first embodiment of the invention.
Figure 7K:
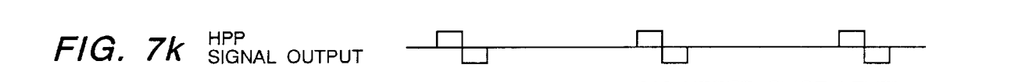
Figure 7M:
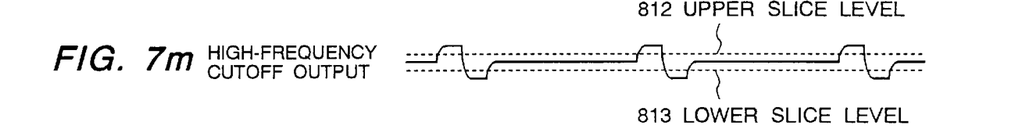
Figure 7N:
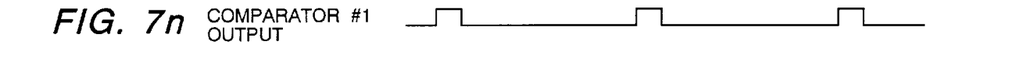
Figure 7P:
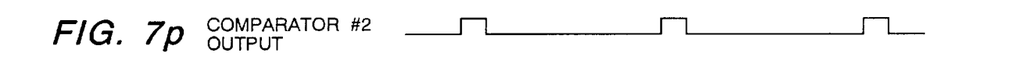
Figure 7Q:
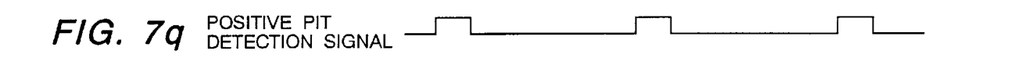
Figure 7R:
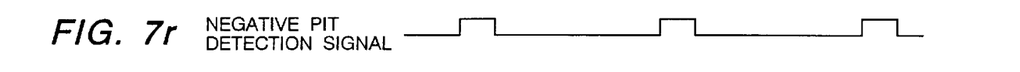
Figure 7S:
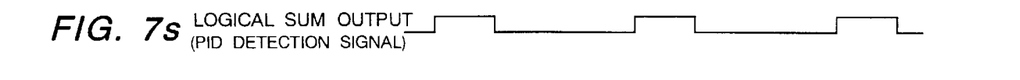

FIG. 5 shows several signal waveforms in one reduction-to-practice version of the PID position detector 127. An exemplary circuit configuration employed herein is shown in FIG. 6. For the HPP signal output waveform in the case of reproducing land tracks, a peak detector 601 and bottom-level detector 602 are used to effectuate an envelop waveform detection. Output signals of these detectors are supplied to comparators 604 and 606, respectively: comparator 604 compares the output of peak detector 601 to a reference potential level indicative of a predefined peak slice level 614 generating at its output a corresponding comparison result signal which is passed to an AND gate logic 607; comparator 606 compares the output of bottom detector 602 to a predefined bottom slice level 616 outputting its comparison result to an AND gate 608. The envelop detection output signals of respective detectors 601, 602 are also fed to a subtraction circuit 603 for extraction of a difference therebetween if any, which difference is then compared at a comparator 605 to a preset difference-signal slice level 615. An output signal of comparator 605 may act as a PID detection signal and also for use as a mask signal in AND gates 607 and 608. AND gates 607, 608 provide output signals one of which serves as a detection signal indicative of the positive side of PID section's pit signal, and the other of which functions as a detection signal representative of the negative side thereof.

By detecting the output sequence of such positive- and negative-side detection signals during a time period in which the PID detection signal is output, it becomes possible for polarity identifier 128 to correctly determine or "judge" which one of the land track and groove track is being presently subject to reproduction.

Figure 8:
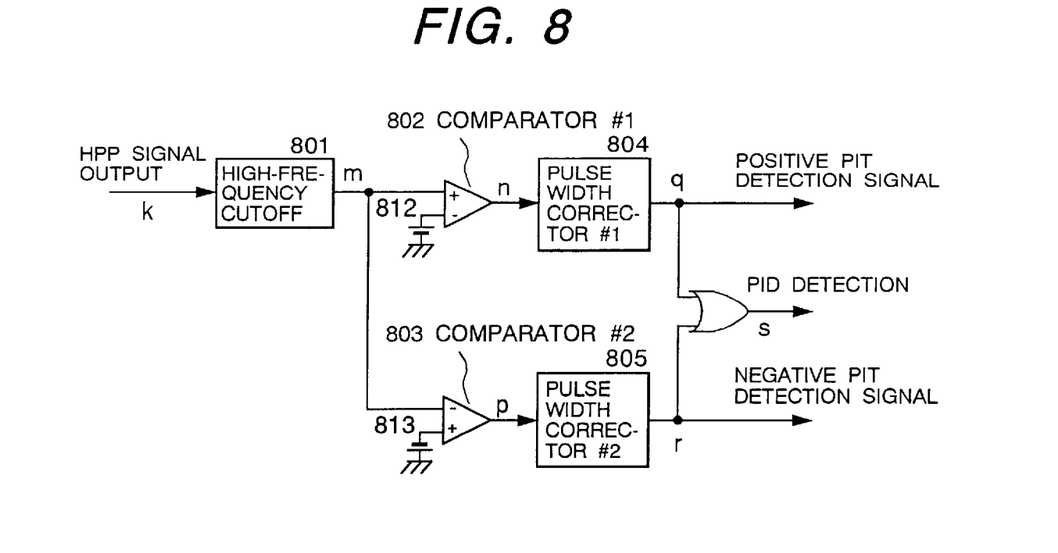
FIG. 8 is a circuit diagram showing a configuration of the PID position detector of the second embodiment of the invention.

FIG. 7 depicts some exemplary signal waveforms in another practiced version of the PID position detector 127 embodying the invention. A circuit configuration thereof is shown in FIG. 8. With respect to the HPP signal output waveform available when one land track is reproduced, a high-frequency cutoff circuit 801 is used to suppress high-frequency components that may correspond to the pit information. An output signal of circuit 801 is supplied to comparators 802 and 803 which operate in a way such that comparator 802 compares the signal to its reference potential 812 indicative of the upper slice level providing a comparison result to a pulse width corrector 804 for enhancement of the pulse width, whereas comparator 803 compares the high-cutoff signal to a lower slice level 813 issuing its comparison signal to another pulse width corrector 805 for pulse width enhancement. Output signals of pulse width correctors 804, 805 are input to an associative logic gate 806 for logically summing them together to thereby provide an output logical sum as a PID detection signal.

Figure 9:
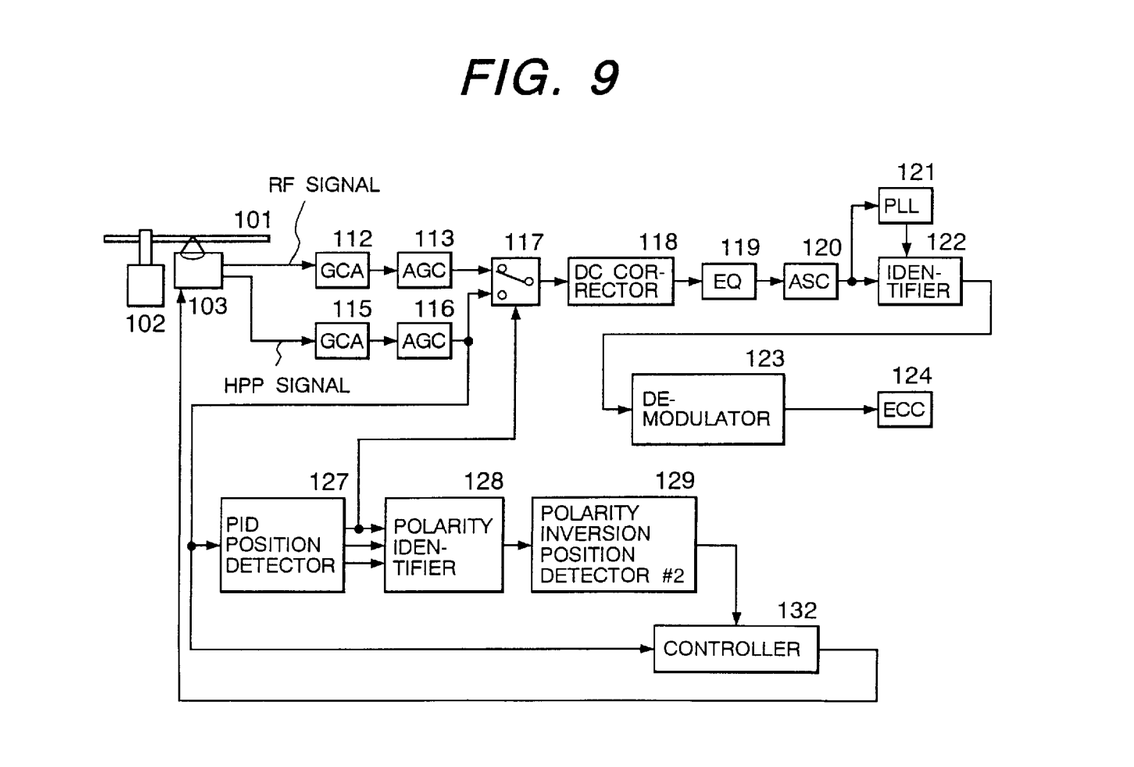
FIG. 9 is a circuit diagram of a reproduction processing system of information read/write apparatus in accordance with a third embodiment employing the concepts of the present invention.

FIG. 9 shows a circuit configuration of a further embodiment of the invention, which is designed here to perform PID detection by exclusive use of the PID position detector 127 of the invention without employing the pit information, and also to detect the polarity and the position alternated land and groove track using only the output signal of PID position detector 127. With such an arrangement, it is possible without having to use the two separate, first and second position alternated land and groove track detectors to detect the position alternated land and groove track irrespective of whether the pit information contains defects therein. Note that the PID detector 127 used in this embodiment may be any one of the circuit configurations shown in FIGS. 6 and 8.

It should be noted that the select switch 117 may be eliminated in some applications for the reason which follows. Select switch 117 is inherently employed for purposes of reading certain information contained in pits such as for example ID numbers. In this respect, where the position alternated land and groove track information alone is recorded in the pits, the second position alternated land and groove track detector 129 per se is capable of detecting the position alternated land and groove track concerned. If this is the case, select switch 117 will be a mere "optional" component and thus no longer be required in particular.

It has been described that the present invention is drawn to a specific disk-like optical data storage medium capable of continuously recording and reproducing (writing and reading) information into and from both the land portions and grooves, and one significant advantage thereof lies in capability of reading intended information with increased reliability because of the fact that the information as recorded in a train of pits at PID sections may be successfully reproducible by use of the HPP signal thus enabling reconstruction of a desired signal with a sufficiently increased amplitude.

Another advantage of the invention is that read/write (recording/reproduction) apparatus may be attainable which is capable of offering stable and reliable read/write operations. This can be said because any land-groove switching part on the data layer may be readily detectable with enhanced reliability based on the sequence of positive and negative polarity components in the HPP signal waveform without having to effectuating demodulation and reproduction of the information as recorded in the pits at PID sections.

What is claimed is:

1. An apparatus for reading information from a storage medium having a track with alternate formation of a plurality of land tracks and groove tracks therein, such that the land tracks and groove tracks appear alternately around predetermined circumference pits having information for distinguishing said land tracks or said groove tracks from each other at a position shifted from a center of said storage medium track, said apparatus comprising:

an optical head for providing light to said storage medium and receiving reflected light from said storage medium, said optical head providing a high-frequency push-pull signal;

a controller for controlling recording and reproduction of information onto said land tracks or groove tracks; and a detector for detecting position changes between land tracks and groove tracks by said high-frequency push-pull signal obtained at said pits.

2. An apparatus for reading information from a storage medium having a track with alternate formation of a plurality of land tracks and groove tracks therein, such that the land tracks and groove tracks appear alternately around predetermined circumference pits having information for distinguishing between said land tracks and said groove tracks at a position offset from a center of said storage medium track, for detecting light reflected from the track of a data layer of said storage medium, and for performing recording and reproduction of information recorded in said track by processing a signal based on the reflected light, wherein said apparatus comprises an optical head for providing light to said storage medium and receiving reflected light from said storage medium, said optical head providing a high-frequency push-pull signal; and a position alternated land and groove track detector for detecting position changes between land tracks and groove tracks by said high-frequency push-pull signal obtained at said pits.

3. An apparatus for reading information from a storage medium having a track with alternate formation of a plurality of land tracks and groove tracks therein, such that the land tracks and groove tracks appear alternately around predetermined circumference pits having information for distinguishing between said land tracks and said groove tracks at a position shifted from a center of said storage medium track, for detecting light reflected from said storage medium, and for performing recording and reproduction of information as recorded in said storage medium track by processing a signal based on the reflected light, wherein said apparatus comprises an optical head for providing light to said storage medium and receiving reflected light from said storage medium, said optical head providing a high-frequency push-pull signal; and a detector for detecting position changes between land tracks and groove tracks by said high-frequency push-pull signal obtained at said pits.

4. The apparatus for reading information from a storage medium according to claim 3, wherein said position alternated land and groove tracks are detected by envelope detection of a tracking error signal.

5. The apparatus for reading information from a storage medium according to claim 3, wherein said position alternated land and groove tracks are detected by cutting off high-frequency components of a tracking error signal.

6. An apparatus for reading information from a storage medium having a track with alternate formation of a plurality of land tracks and groove tracks therein, such that the land tracks and groove tracks appear alternately around predetermined circumference pits at least having information for distinguishing between said land tracks and said groove tracks and being shifted in position from a center of said storage medium track, a photodetector for detecting a return light of a light irradiator such as an optical head to generate a signal based on the return light, and a signal processor for processing the signal thereby reproducing information while permitting a tracking control of said light irradiator, said apparatus comprising:

an optical head for providing light to said storage medium and receiving reflected light from said storage medium, said optical head providing a high-frequency push-pull signal; and a detector for detecting position changes between land tracks and groove tracks by said high-frequency push-pull signal obtained at said pits, wherein said signal processor generates a signal indicative of said land tracks and said groove tracks by processing a tracking error signal, and that a tracking control of said light irradiator is performed at said land tracks and groove tracks based on said signal at said land tracks and said groove tracks.

7. An apparatus for reading information from a storage medium having a track with alternate formation of a plurality of land tracks and groove tracks therein, such that the land tracks and groove tracks appear alternately around predetermined circumference pits having information for distinguishing between said land tracks and said groove tracks and being offset in position from a center of said storage medium track, and for reproducing information by causing an information processor to process an optical information signal, wherein said apparatus comprises an optical head for providing light to said storage medium and receiving reflected light from said storage medium, said optical head providing a high-frequency push-pull signal; a detector for detecting position changes between land tracks and groove tracks by said high-frequency push-pull signal obtained at said pits; and a selector for selecting a tracking error signal when a light irradiator such as an optical head irradiates light at a position of formation of said pits, and for, when said irradiator emits light upon one of said land tracks and said groove tracks, selecting said information signal thereby outputting this signal to said signal processor.

8. The apparatus for reading information from a storage medium according to claim 7, further comprising a formation position detector for detecting a formation position of said pits by detecting a change of said tracking error signal, and wherein said selector is responsive to an output of said formation detector for selecting between said information signal and said tracking error signal.

9. An apparatus for reading information from a storage medium having a track with alternate formation of a plurality of land tracks and groove tracks therein, such that the land tracks and groove tracks appear alternately around predetermined circumference pits having information for distinguishing between said land tracks and said groove tracks and being offset in position from a center of said storage medium track, and for reproducing information by causing an information processor to process an optical information signal, wherein said apparatus comprises:

an optical head for providing light to said storage medium and receiving reflected light from said storage medium, said optical head providing a high-frequency push-pull signal;

a first detector for detecting, based on information contained in a tracking error signal, a position alternated land and groove track whereat said land track and said groove track are switched therebetween; and a second detector for detecting position changes between land tracks and groove tracks by said high-frequency push-pull signal obtained at said pits.

10. The apparatus for reading information from a storage medium according to claim 9, further comprising a tracking controller for controlling tracking of a light irradiator such as an optical head and a focus controller for controlling focussing of said light irradiator for performing a tracking control or a focus control corresponding to said land track or said groove track in response to an output of said first or second position alternated land and groove track detector.

11. The apparatus for reading information from a storage medium according to claim 9, wherein when the information contained in said tracking error signal remains unable to be read for a plurality of times, an output of said second position alternated land and groove track detector is supplied to said tracking controller and said focus controller.

12. The apparatus for reading information from a storage medium according to claim 11, wherein said second position alternated land and groove track detector detects said position alternated land and groove tracks by filtering high-frequency components of said tracking error signal.

13. An apparatus for reading information from a storage medium having a track with alternate formation of a plurality of land tracks and groove tracks therein, such that the land tracks and groove tracks appear alternately around predetermined circumference pits having information for distinguishing between said land tracks and said groove tracks and being offset in position from a center of said storage medium track, and for reproducing information by causing an information processor to process an optical information signal, wherein said apparatus comprises:

an optical head for providing light to said storage medium and receiving reflected light from said storage medium, said optical head providing a high-frequency push-pull signal;

a formation position detector for detecting a formation position of a pit from a change of tracking error signals;

a first selector responsive to an output of said formation position detector for selecting said tracking error signal when a light irradiator such as an optical head emits light at a position whereat said pits are formed, and for, when said light irradiator emits light at one of said land tracks and said groove tracks, selecting said information signal to thereby output the signal to said signal processor;

a first position alternated land and groove track detector responsive to information contained in the tracking error signal as processed by said signal processor for detecting a position alternated land and groove track whereat said land track and said groove track are switched therebetween;

a second position alternated land and groove track detector for detecting position changes between land tracks and groove tracks by said high-frequency push-pull signal obtained at said pits; and a second selector for providing an output of said second position alternated land and groove track detector to a tracking controller and a focus controller when said signal processor fails to read the information contained in said tracking error signal for a plurality of iterations, wherein the tracking controller for controlling tracking of said light irradiator and the focus controller for controlling focussing of said light irradiator perform a tracking control or focus control corresponding to said land track or said groove track based on an output of said second selector.

14. The apparatus for reading information from a storage medium according to claim 13, wherein said second position alternated land and groove track detector detects said position alternated land and groove tracks by detection of a change of waveform of said tracking error signal between a positive and a negative polarity.

15. The apparatus for reading information from a storage medium according to claim 13, wherein said second position alternated land and groove track detector detects said position alternated land and groove tracks by envelope detection of said tracking error signal.

16. The apparatus for reading information from a storage medium according to any one of claims 4 to 6, wherein said tracking error signal is a signal obtained by detection of diffraction light from a groove resulting from formation of said land tracks and said groove tracks and said pits.

17. An apparatus for reading information from a disk-shaped data storage medium having land tracks and groove tracks alternately formed in a spirally continuing track on a layer thereof, such that the land tracks and groove tracks appear alternately around predetermined circumference pits having information for distinguishing between land tracks and groove tracks and being offset from a center of said storage medium track, said apparatus comprising:

an optical head for providing light to said storage medium and receiving reflected light from said storage medium, said optical head providing a high-frequency push-pull signal;

an information read/write device for irradiating light onto said medium, for detecting light reflected from a respective one of said land tracks, groove tracks and pits, and for processing a signal based on such reflected light to perform recording and reproduction of information as recorded in said track;

an information reproduction means for processing a signal based on reflection light from said land tracks and said groove tracks to thereby reproduce recorded information;

a position alternated land and groove track detector for detecting position changes between land tracks and groove tracks by said high-frequency push-pull signal obtained at said pits; and a control means for controlling an irradiation position of a light spot in coordination with an output of said position alternated land and groove track detector.

18. A polarity inversion detection method for an information recording medium having a track with alternate formation of a plurality of land tracks and groove tracks therein, such that the land tracks and groove tracks appear alternately around predetermined circumference pits having information for distinguishing between said land tracks and said groove tracks and being offset from a center of said storage medium track, an optical head for providing light to said storage medium and receiving reflected light from said storage medium, said optical head providing a high-frequency push-pull signal; and a detector for detecting position changes between land tracks and groove tracks by said high-frequency push-pull signal obtained at said pits; said method comprising detecting a position whereat said land tracks and said groove tracks change therebetween, wherein a position alternated land and groove track whereat said land track and said groove track change therebetween is detected by use of a tracking error signal increasable with an increase in magnitude of a deviation from a center of said storage medium track.

19. The polarity inversion detection method for an information recording medium according to claim 18, wherein said position alternated land and groove track is detected by detecting a change in waveform of said tracking error signal.

20. The polarity inversion detection method for an information recording medium according to claim 18, wherein said position alternated land and groove track is detected by detecting a change in polarity of a waveform of said tracking error signal between a positive and a negative polarity.

21. The polarity inversion detection method for an information recording medium according to claim 18, wherein said position alternated land and groove track is detected by envelope detection of said tracking error signal.

22. The polarity inversion detection method for an information recording medium according to claim 18, wherein said position alternated land and groove track is detected by filtering high-frequency components of said tracking error signal.

23. The polarity inversion detection method for an information recording medium according to claim 18, wherein said position alternated land and groove tracks are detected by reading information contained in said tracking error signal.

24. A method for reading information from a storage medium having thereon a track with alternate formation of a plurality of land tracks and groove tracks, such that the land tracks and groove tracks appear alternately around predetermined circumference pits having information for distinguishing between said land tracks and said groove tracks and being offset from a center of said storage medium track, an optical head for providing light to said storage medium and receiving reflected light from said storage medium, said optical head providing a high-frequency push-pull signal; and a detector detecting position changes between land tracks and groove tracks by said high-frequency push-pull signal obtained at said pits; and for reproducing information by processing a signal based on a return light from a light irradiator such as an optical head, wherein said method comprises the steps of:

generating, based on information contained in a tracking error signal, a first position alternated land and groove track detection signal indicative of a position alternated land and groove track whereat said land track and said groove track change therebetween;

generating a second position alternated land and groove track detection signal representative of said position alternated land and groove tracks by detecting position changes between land tracks and groove tracks by said high-frequency push-pull signal obtained at said pits; and irradiating light while performing a tracking control and focus control suitable for said land track or said groove track based on a said first or second position alternated land and groove track detection signal.

25. The method for reading information from a storage medium according to claim 24, wherein when the information contained in said tracking error signal is failed to be read for a plurality of times, light is irradiated for information reproduction while the tracking control and focus control suitable for said land track or said groove track are performed based on the second position alternated land and groove track detection signal.

26. The method for reading information from a storage medium according to claim 25, wherein said second position alternated land and groove track detection signal is generated by filtering high-frequency components of said tracking error signal.

27. The method for reading information from a storage medium according to claim 24, wherein said second position alternated land and groove track detection signal is generated by detecting a change in polarity of a waveform of said tracking error signal between a positive and a negative polarity.

28. The method for reading information from a storage medium according to claim 24, wherein said second position alternated land and groove track detection signal is generated by envelope detection of said tracking error signal.

29. The method for reading information from a storage medium according to claim 24, wherein said tracking error signal is a signal obtained by detection of a diffraction light at a groove track resulting from formation of said land track and said groove track and said pits.

* * * * *